W. A. Jordan.
Elevated Railway.
No. 472. Reissued Jun. 16, 1857.
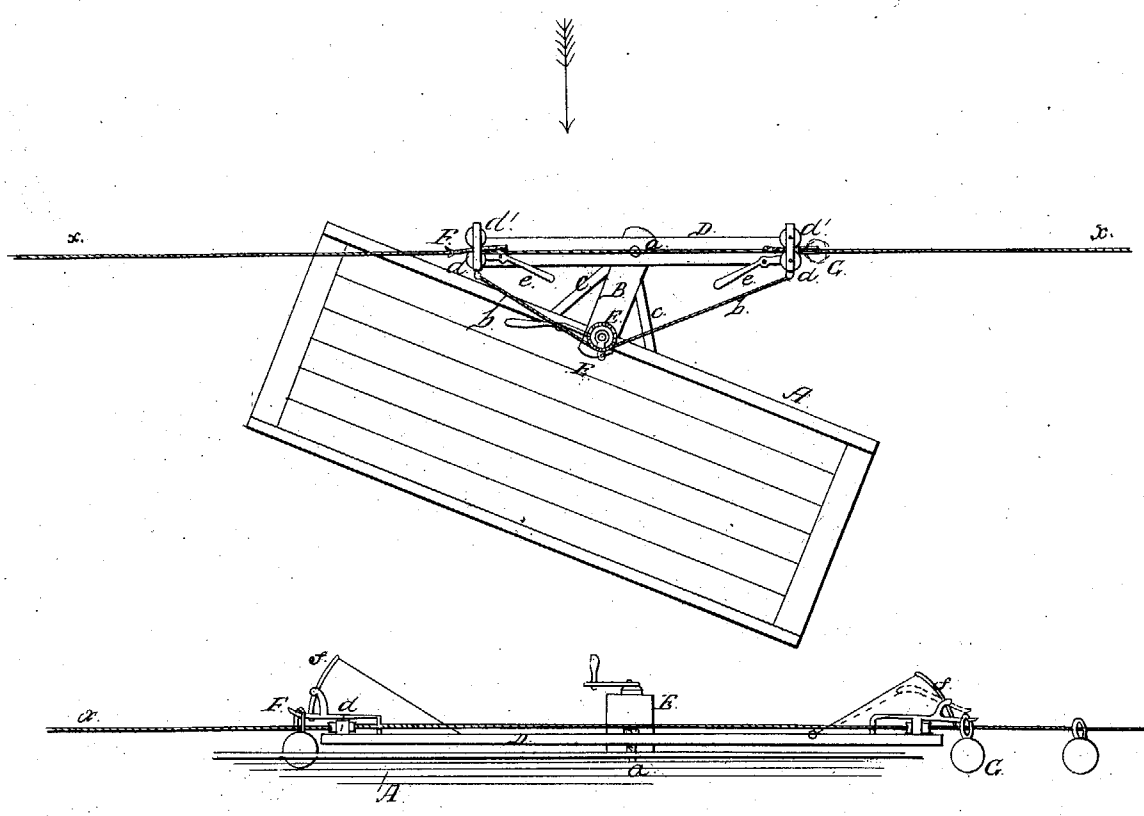
N. PETERS, PHOTO-LITHOGRAPHER, WASHINGTON, D. C.

UNITED STATES PATENT OFFICE.

WILLIAM A. JORDAN, OF THIBODEAUX, LOUISIANA.

IMPROVEMENT IN MEANS FOR GUIDING LINE FERRY-BOATS IN FLYING BRIDGES.

Specification forming part of Letters Patent No. 15,487, dated August 5, 1856; Reissue No. 472, dated June 16, 1857.

*To all whom it may concern:*

Be it known that I, WILLIAM A. JORDAN, of Thibodeaux, in the parish of La Fourche and State of Louisiana, have invented certain new and useful Improvements in Crossing Rivers by a Flying Bridge or Ferry; and I do hereby declare that the following is a full, clear, and exact description of the same, reference being had to the annexed drawings, making a part of this specification, in which—

Figure 1 is a plan or top view of my improvement. Fig. 2 is a side view of the same.

Similar letters of reference indicate corresponding parts in the two figures.

This invention consists in the employment of mechanical means for adjusting a boat more or less obliquely with a cable or rope stretched from bank to bank of a stream, the boat being connected with the rope by pulleys or travelers and retained in the proper or desired oblique position relatively with the cable or rope by the means above alluded to, whereby the force of the stream may be advantageously used for the propulsion of the boat across the stream in either direction.

To enable those skilled in the art to fully understand and construct my invention, I will proceed to describe it.

A cable or rope, *x x*, is stretched across a stream at a suitable height from its surface by means of a windlass or other proper means.

A is a boat, which may be constructed in any suitable way, and from one of its gunwales or sides a bar or beam, B, projects horizontally and at right angles and properly secured or supported by braces *c c*.

D represents a bar, to the center of which the bar or beam B is secured by a bolt, *a*, which serves as a pivot or center, as will be hereinafter referred to. This bar D has a pulley, *d'*, secured within a suitable box at each end of it, and a roller, *d*, is secured in a forked lever, *e*, at each end of the bar D. The cable or rope *x x* passes between these pulleys *d' d'*, and as the boat A is attached to it by the bar or beam B the bar D is in fact a traveler. The movable or adjustable pulleys or rollers *d* may be pressed more or less against the rope, so that the pulleys may clutch it more or less tightly, and serves as a brake to check the speed of the boat when required, the pulleys *d* being moved or adjusted by actuating the levers *e*.

To each end of the bar D a rope or chain, *b b*, is attached. This rope or chain is passed with two or three turns around a winch or windlass, E, which is secured to the end of the bar or beam B at its junction with the gunwale of the boat. The windlass is secured or retained by a ratchet and pawl arranged in any proper way.

To each end of the bar D a forked rest, F, is attached, and on the ends of these rests weights G are placed. These weights may be displaced or cast off from the rests when desired by means of the levers *f*, which are actuated by cords attached to the upper ends of said levers.

From the above description of parts it will be seen that when the cable is passed between the pulleys *d d'* and stretched sufficiently taut across the stream, and the winch or windlass E brought in an oblique position relatively with the cable or rope, as shown clearly in Fig. 1, the stream or current, which runs in the direction indicated by the arrow, in striking the boat obliquely will of course propel it across the stream. As the boat approaches the bank, the attendant checks its speed by turning the boat parallel with the cable *x x* and bar D, it being remembered that the beam B turns on the bolt or pivot *a* at its center. In case the boat is under considerable headway and the turning of the boat parallel with the cable or rope and bar D does not check it sufficiently soon, the levers *d* are made to clutch the cable by actuating the levers *e*, and its speed may be suddenly checked. It will be understood, of course, that the boat may be propelled in either direction across the stream by adjusting it in the proper oblique position relatively with the cable and the direction of the current. The rope may be sunk when necessary, in order that navigation of the stream may not be obstructed by casting off the weight or weights on the aft-rest F.

The propulsion of boats across streams by the force of the current has been effected by attaching the boat to a traveler on the rope and guarding the boat and keeping it in an oblique position relatively with the current by an oar. This, however, is very laborious work, and in many cases is impracticable.

It is obvious that many modifications of the device herein described may be used; in fact, various ways would suggest themselves at once to the mind of a mechanic wherein mechanical means might be adapted to adjust the boat in the relative position with the cable, and also to retain the boat in said position while being acted upon by the current. I therefore do not confine myself to the precise means herein employed for effecting the desired result; but,

Having thus described my invention, what I claim as new, and desire to secure by Letters Patent, is—

Adjusting the boat A relatively with the cable or rope *x x* by the means herein described or by any mechanism, when said mechanism is so arranged as not only to effect the adjusting or turning the boat, but also to retain it when adjusted, for the purpose set forth.

WILLIAM A. JORDAN.

Witnesses:

V. D. EENEBONNÉ,

JOSEPH EPNIEIOS.